(12) United States Patent
Warwick et al.

(10) Patent No.: US 7,055,048 B2
(45) Date of Patent: *May 30, 2006

(54) SYSTEM AND METHOD FOR ACCESSING INFORMATION MADE AVAILABLE BY A KERNEL MODE DRIVER

(75) Inventors: Alan M Warwick, Bellevue, WA (US); Dilip C Naik, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/845,458

(22) Filed: May 13, 2004

(65) Prior Publication Data

US 2004/0210908 A1 Oct. 21, 2004

Related U.S. Application Data

(63) Continuation of application No. 10/454,391, filed on Jun. 3, 2003, now Pat. No. 6,763,472, which is a continuation of application No. 09/360,544, filed on Jul. 26, 1999, now Pat. No. 6,598,169.

(51) Int. Cl.
*G06F 1/32* (2006.01)

(52) U.S. Cl. .................. 713/320; 719/313; 719/318; 719/321

(58) Field of Classification Search .............. 719/310, 719/313, 318, 320, 321, 327; 713/1, 2, 300 713/320, 322
See application file for complete search history.

(56) References Cited

U.S. PATENT DOCUMENTS

| | | | |
|---|---|---|---|
| 5,845,280 A | 12/1998 | Treadwell, III et al. | |
| 5,903,894 A | 5/1999 | Reneris | |
| 5,983,353 A | 11/1999 | McHann, Jr. | |
| 5,999,730 A | 12/1999 | Lewis | |
| 6,026,238 A | 2/2000 | Bond et al. | |
| 6,081,901 A | 6/2000 | Dewa et al. | |
| 6,105,142 A | 8/2000 | Goff et al. | |
| 6,115,823 A | 9/2000 | Velasco et al. | |
| 6,122,748 A | 9/2000 | Hobson | |
| 6,131,131 A | 10/2000 | Bassman et al. | |
| 6,131,166 A * | 10/2000 | Wong-Insley | 713/300 |
| 6,167,511 A | 12/2000 | Lewis | |
| 6,185,677 B1 * | 2/2001 | Nijhawan | 713/2 |
| 6,212,574 B1 | 4/2001 | O'Rourke et al. | |

(Continued)

OTHER PUBLICATIONS

"Advanced Configuration and Power Interface Specification," co-developed by Intel, Microsoft, and Toshiba, Revision 2.0c, Aug. 25, 2003.

(Continued)

*Primary Examiner*—William Thomson
*Assistant Examiner*—Van H. Nguyen
(74) *Attorney, Agent, or Firm*—Christsensen O'Connor Johnson Kindness PLLC

(57) ABSTRACT

An invention is disclosed that provides a mechanism for exposing to user mode applications the features and information enabled by the Advanced Configuration and Power Interface ("ACPI") specification. The present invention provides a generic mapping driver that executes in kernel mode, and that makes calls to the ACPI driver accessible by user mode applications. The mapping driver may be a part of a management instrumentation system, such as the Windows Management Instrumentation ("WMI") system. The WMI system provides an interface through which instrumented components, such as hardware devices, can provide information and notification to management applications in user mode through a consistent management information store. The mapping driver provides access to the ACPI system from the WMI management system.

17 Claims, 5 Drawing Sheets

U.S. PATENT DOCUMENTS 6,230,279 B1   5/2001   Dewa et al.
6,378,076 B1 * 4/2002   Qureshi .................... 713/322
6,598,169 B1 * 7/2003   Warwick et al. ............ 713/320
6,763,472 B1 * 7/2004   Warwick et al. ............ 713/320

OTHER PUBLICATIONS

"Windows Instrumentation: WMI and ACPI," updated Dec. 4, 2001.

* cited by examiner

SYSTEM AND METHOD FOR ACCESSING INFORMATION MADE AVAILABLE BY A KERNEL MODE DRIVER

CROSS-REFERENCES TO RELATED APPLICATIONS

This application is a continuation of, and claims priority from, U.S. patent application Ser. No. 10/454,391, filed on Jun. 3, 2003, now U.S. Pat. No. 6,763,472 B2, issued Jul. 13, 2004, which is a continuation of U.S. patent application Ser. No. 09/360,544, filed Jul. 26, 1999, now U.S. Pat. No. 6,598,169 B1, issued Jul. 22, 2003.

FIELD OF THE INVENTION

The present invention generally relates to management instrumentation systems, and more specifically relates to computer systems having instrumented hardware devices.

BACKGROUND OF THE INVENTION

The Advanced Configuration and Power Interface ("ACPI") specification is an open-industry specification, co-developed by Intel, Microsoft, and Toshiba, that defines an interface to a computer system board that enables the operating system to implement operating-system directed power management and system configuration. By following the ACPI specification, manufacturers can build systems consistent with the "OnNow" design initiative for instantly available computer systems.

ACPI compliant hardware includes features necessary to support operating system power management, such as hard disk spin-down, video power-down, or modem power-off. The interfaces to those features are described using the Description Tables in the ACPI specification. The features of ACPI hardware are controlled through ACPI Software Language ("ASL") control methods compiled and stored in the system Basic Input/Output System ("BIOS") or non-volatile Random Access Memory (NVRam). The ASL control methods are typically interpreted and executed by a virtual machine that is embedded in an ACPI driver within the ACPI system. The operating system calls down to the ACPI driver, which accesses the features associated with the ACPI hardware.

Until now, the functionality provided by the ACPI specification has been limited to power management controlled by the operating system. The features made available by ACPI hardware, as well as other features enabled by the ACPI specification, have been accessible only by the operating system because the ACPI driver is a kernel mode driver and, therefore, is not directly accessible by software application programs executing in user mode. As is known in the art, "kernel mode" refers to processing that occurs at the most privileged and protected level of the operating system. Kernel mode software resides in protected memory at all times and provides basic operating system services. "User mode" refers to processing that occurs at the application layer and which does not have general access to kernel mode drivers.

In the past, a developer of a user mode application that desired access to the information and features made possible by ACPI hardware needed to create a private kernel mode driver that was able to interface with the kernel mode ACPI driver, and then provide an interface to that private kernel mode driver from the user mode application. Unfortunately, that solution has the disadvantage of requiring all the developers of user mode applications to develop unique kernel mode drivers to essentially provide private access to the ACPI driver. Moreover, if each user mode application has a corresponding kernel mode driver to perform essentially the same task, the computer system suffers the performance burden of having similar code executing in several disparate drivers all loaded in the kernel. Still another disadvantage of existing technologies is that the user mode interface is inconsistent and nonuniform.

Accordingly, a need exists for a mechanism by which the information and features of ACPI compliant hardware can be exposed to user mode applications without the need to develop private kernel mode drivers for each of several user mode applications.

SUMMARY OF THE INVENTION

According to aspects of the present invention, a computing system having an operating environment with at least two operational modes, for interfacing a user application to a system component, is presented. The exemplary system includes a management module. The management module operates in a first operational mode and, in response to an instruction from an external application, issues a first interface message to the system component. The exemplary system also includes a translation module. The translation module, in contrast to the management module, operates in a second operational mode. The translation module is communicatively coupled to the system component, and also communicatively coupled to the management module. The translation module receives the first interface message from the management module and translates information in the first interface message to create a second interface message. The translation module then issues the second interface message to the system component.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The present invention is directed to a system and method for making ACPI information available to management applications operating in user mode. The present invention may be embodied in a management instrumentation system, such as the "Windows Management Instrumentation" (WMI) system promoted by Microsoft Corporation of Redmond, Wash.

Figure 1:
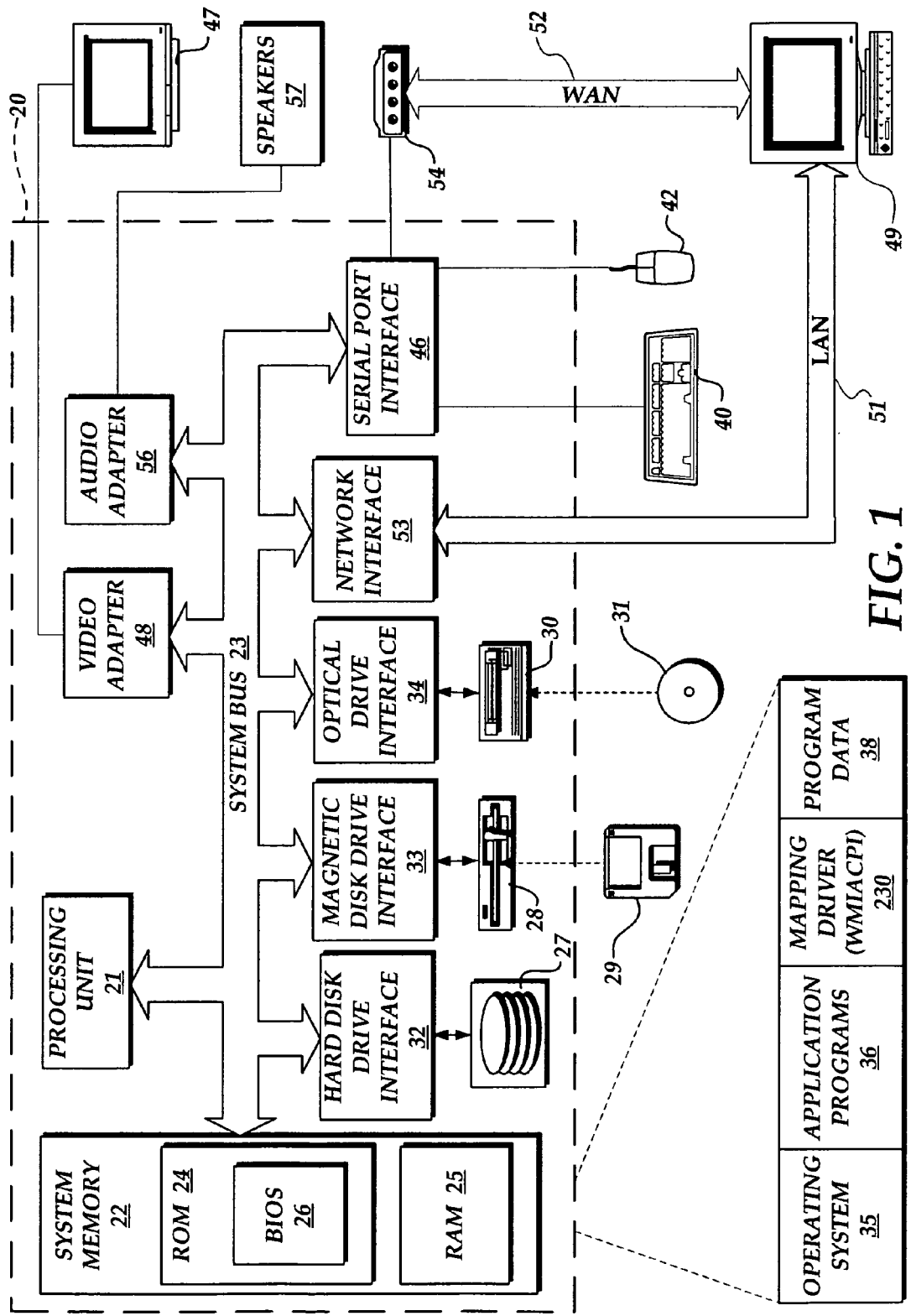
FIG. 1 is a functional block diagram of a computer suitable for providing an exemplary operating environment for the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc., that perform particular tasks or implement particular abstract data types. Moreover, those skilled in the art will appreciate that the invention may be practiced with other computer system configurations, including handheld devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring to FIG. 1, an exemplary system for implementing the invention includes a conventional personal computer 20, including a processing unit 21, a system memory 22, and a system bus 23 that couples the system memory to the processing unit 21. The system memory 22 includes read-only memory (ROM) 24 and random access memory (RAM) 25. A basic input/output system 26 (BIOS), containing the basic routines that help to transfer information between elements within the personal computer 20, such as during start-up, is stored in ROM 24. The BIOS 26 may additionally store AML code for use in conjunction with an associated ACPI device. The personal computer 20 further includes a hard disk drive 27; a magnetic disk drive 28, e.g., to read from or write to a removable disk 29; and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage for the personal computer 20. Although the description of computer-readable media above refers to a hard disk, a removable magnetic disk, and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, a mapping driver 230 constructed in accordance with one embodiment of the present invention, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
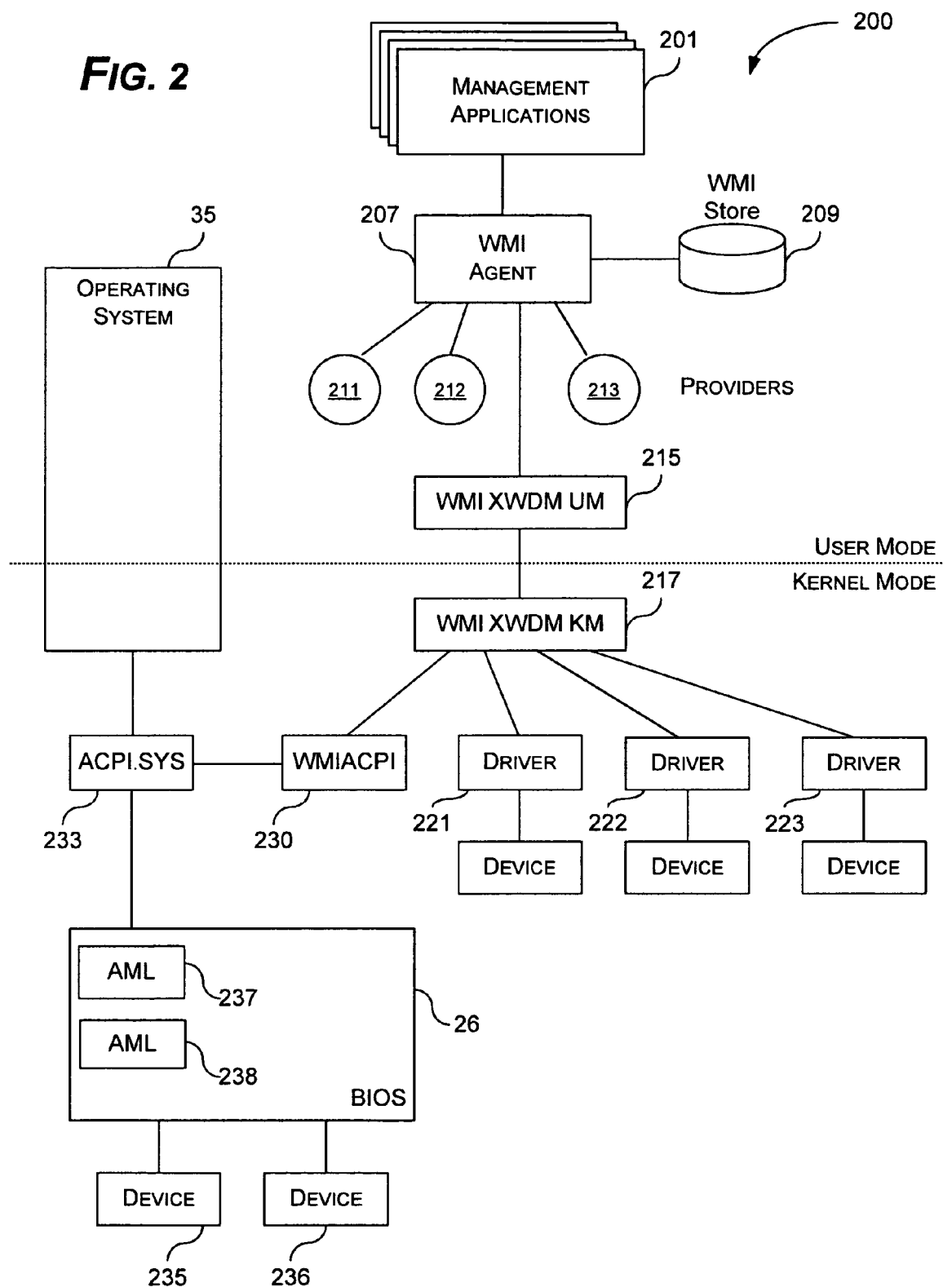
FIG. 2 is a functional block diagram of software components embodying the present invention resident on the computer system of FIG. 1.

FIG. 2 is a functional block diagram of software components embodying the present invention resident on the computer 20 of FIG. 1. Illustrated is a management system 200, including multiple management applications 201 executing in user mode 203. The management system 200 may be any CIM schema compliant management system, such as the WMI system described above. Although embodiments of the present invention may be described here in cooperation with the WMI management system, the present invention is equally applicable to other management systems. Reference here to the WMI management system is for illustrative purposes only, and does not limit the applicability of the invention.

Interfacing with the management applications 201 is a WMI agent 207. The WMI agent 207 maintains and provides access to a WMI store 209, which is a database containing the management information exposed by the management system 200. The management information stored in the WMI store 209 comes from multiple WMI providers, such as components 211, 212, and 213. The WMI providers act as intermediaries between the WMI agent 207 and one or more managed objects. When the WMI agent 207 receives a request from a management application 201 for information that is not available from the WMI store 209, or for notification of events that it does not support, it forwards the request to the appropriate WMI provider. The WMI provider then supplies the requested information or event notification.

One such WMI provider is the WMI Extensions to Windows Driver Model ("XWDM") provider ("WDM Provider UM") 215. The WDM Provider UM 215 communicates with the WDM Provider kernel mode software ("WDM Provider KM") 217. Those two software components, the WDM Provider UM 215 and the WDM Provider KM 217, allow instrumented devices to make management information available to the management system by providing a pipeline between the user mode 203 and the kernel mode 219.

In kernel mode 219, several drivers 221, 222, 223 support their associated devices and pass information to the management system 200 via the WDM Provider KM 217. The drivers operate in conjunction with the management system 200 to allow the management applications to query or set management information within the several instrumented devices. In addition to queries and sets, the management system allows WMI method calls, which are functionally equivalent to an I/O control ("IOCTL") call to a device. One driver, the ACPI mapping driver (the "mapping driver") 230, is configured to interface with the ACPI system.

Figure 3:
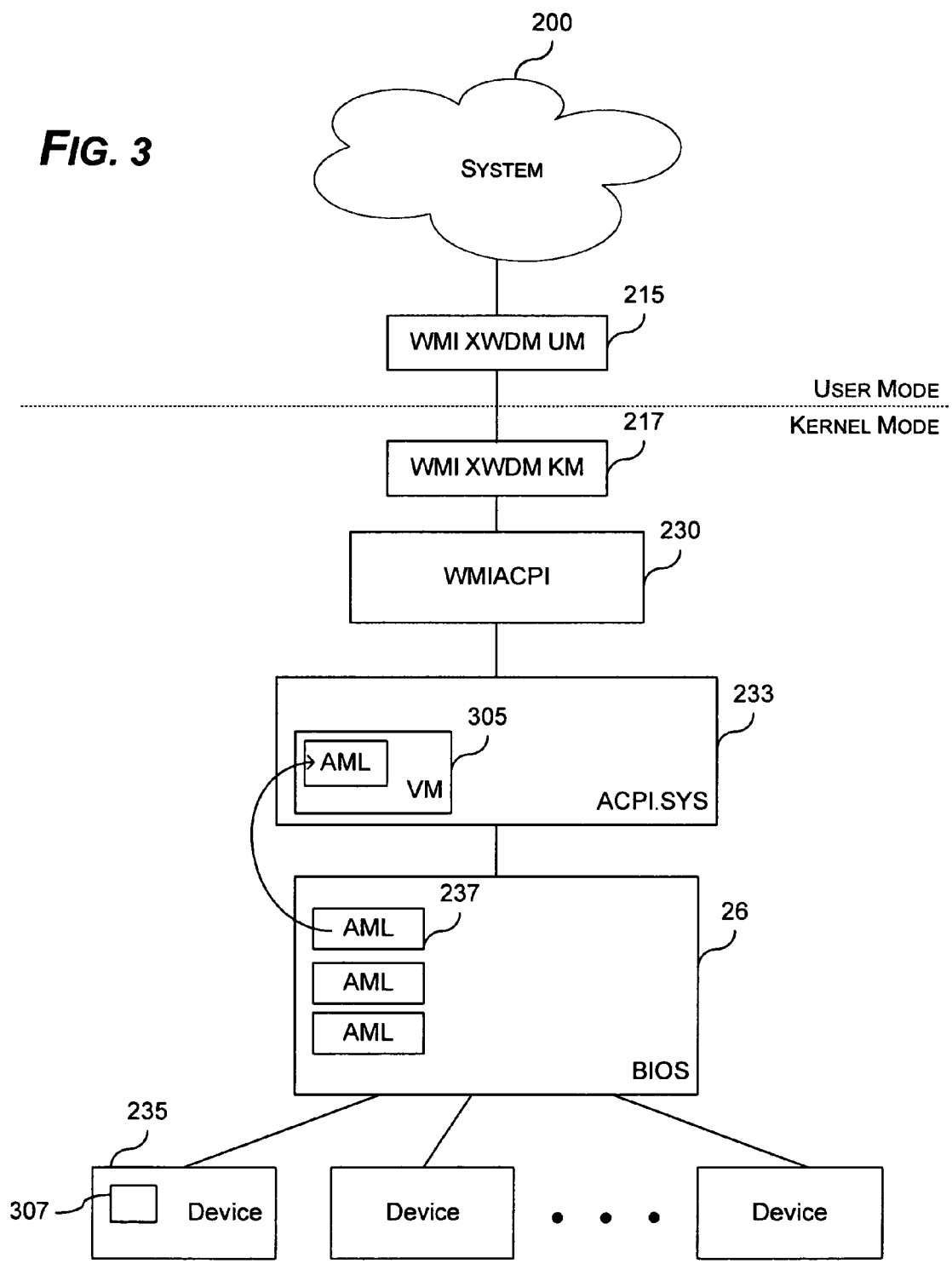
FIG. 3 is a functional block diagram of the software components illustrated in FIG. 2 executing ACPI code within the ACPI driver and being accessed by the mapping driver.

Within the ACPI system, certain hardware or software devices, such as device 235, provide ACPI information to the operating system 35 via the BIOS 26 and the ACPI driver 233. The interaction of the BIOS 26, the ACPI driver 233, and the hardware devices 235 is illustrated in FIG. 3 and discussed in detail below. Briefly stated, the ACPI driver 233 interacts with ACPI hardware, such as devices 235, 236, through AML code 237, 238 (respectively) stored in the BIOS 26. In normal operation, the operating system 35 manages the power usage of the hardware devices by issuing commands to the ACPI driver 233 to either retrieve information from, or set the operational state of, the hardware devices 235, 236.

In accordance with this embodiment of the invention, the mapping driver 230 is configured to receive commands from the management system 200, translate those commands into ACPI compliant commands, and issue the ACPI compliant commands to the ACPI system via the ACPI driver 233. In addition, the hardware devices may be configured to generate WMI events in response to some condition, such as a sensor exceeding a threshold temperature. The ACPI driver 233 receives a notification of the condition from the hardware device 235 in the conventional manner. If the mapping driver 230 has registered with the ACPI driver 233 to receive the event, the ACPI driver 233 passes the notification to the mapping driver 230. In response, the mapping driver 230 makes a control method call to the ACPI driver to obtain additional information about the event, and then translates the notification and additional information to a WMI-compliant message and issues that message to the WMI agent 207, via the WDM Provider KM 217 and the WDM Provider UM 215. The WMI agent 207 then stores information related to the event in the WMI store 209. In that way, the management applications 201 may take advantage of the information stored within the WMI store 209 related to the ACPI hardware devices 235 as well as register to receive notification of any events generated by those devices.

FIG. 3 is a functional block diagram illustrating in greater detail the interaction between the mapping driver 230 and the ACPI driver 233 to achieve the benefits of the present invention. In accordance with the ACPI specification, AML code 237 associated with a particular ACPI device 235 is stored within the BIOS 26 or other permanent memory of the computer 20. AML code 237 is uncompiled computer-executable code for controlling the ACPI features of the hardware device 235. The AML code 237 is stored in the BIOS 26 or other permanent memory as machine language. The AML code 237 is executed by an AML interpreter 305 controlled by the ACPI driver 233.

At initialization, the ACPI driver 233 reads the AML code 237 from the BIOS 26, or other permanent memory, and begins executing the code with the AML interpreter 305. In that way, the ACPI driver 233 gains control of the ACPI features provided by the hardware device 235 associated with the AML code 237. For example, hardware device 235 may be a temperature sensor. The current operating temperature of the computer 20 may be stored in a temperature register 307. In that case, the AML code 237 defines a procedure for accessing the data in the temperature register 307 and making that data available.

To access the data stored in the temperature register 307, the WMI agent 207 may issue a message to the mapping driver 230, via the WDM Provider UM 215 and the WDM Provider KM 217. The message contains a GUID identifying the data of interest (i.e., the data in the temperature register 307). The mapping driver 230 then converts the message from the WMI format to an internal IOCTL IRP format that contains a control method call. An appropriate ACPI message is then issued to the ACPI driver 233 by the mapping driver 230 to cause the ACPI driver 233 to execute that control method. In response to the ACPI message, the ACPI driver 233, via the AML interpreter 305 interpreting the AML code corresponding to the control method, retrieves the data from the temperature register 307 and returns the data to the mapping driver 233. The mapping driver 233 may then return the data to the WMI agent 207, via the WDM Provider KM 217.

Figure 4:
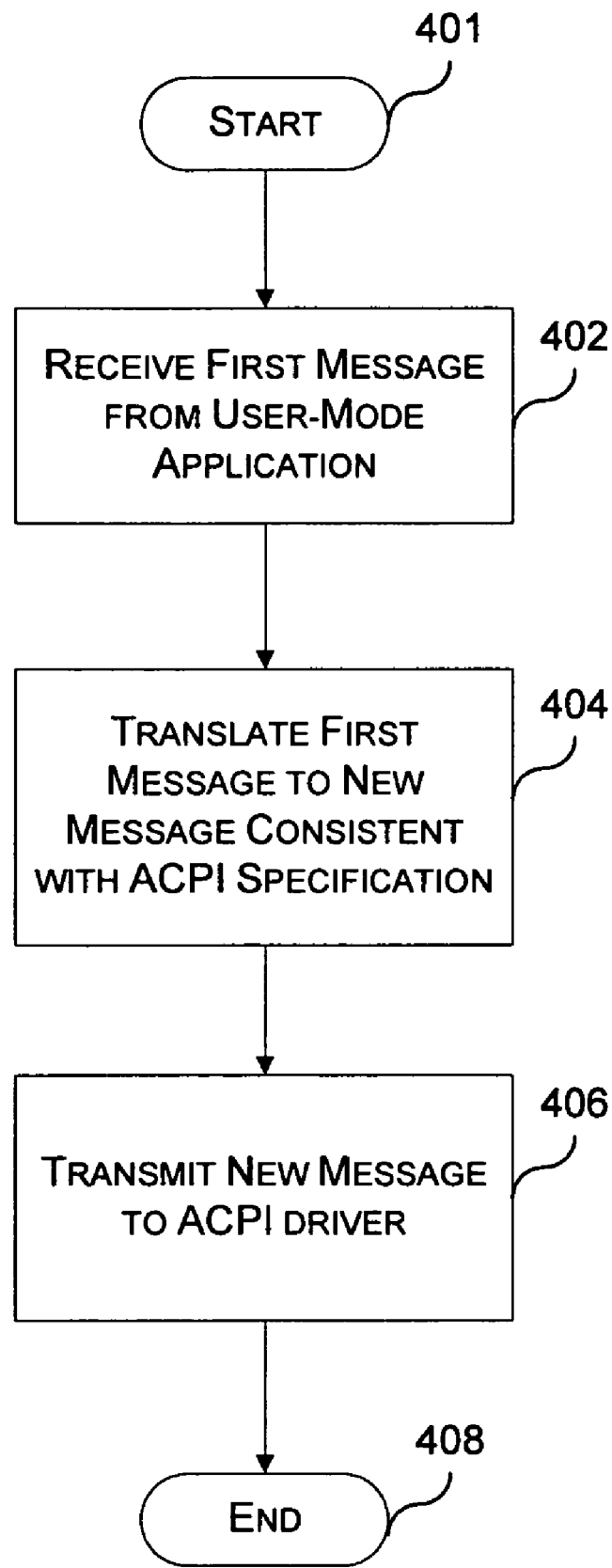
FIG. 4 is a logical flow diagram illustrating a process for a user mode application to query for ACPI related information by way of the mapping driver, constructed in accordance with the present invention.

FIG. 4 is a logical flow diagram illustrating a process for a user mode application to query for ACPI related information by way of the mapping driver 230. The process begins at starting block 401, where the management system 200, executing in user mode 203, issues a query for a data block associated with the ACPI device 235, such as a temperature sensor. Processing continues at block 402.

At block 402, the mapping driver 230, executing in kernel mode 219, receives from the management system 200 the query identifying the data block. For example, the query may request the value stored in the temperature register 307. Processing then proceeds to block 404.

At block 404, the query is examined and the ACPI control method that corresponds to the query is determined, and the message format is translated from its received format to a control method invocation message having a format consistent with the ACPI system. The particular mappings from the received format to the format consistent with the ACPI system are a design consideration and are driven by the particular ACPI features provided by the hardware. One example of particular mappings between the WMI system and the ACPI system may be found in the article entitled "Windows Instrumentation: WMI and ACPI," attached hereto and incorporated herein by reference. After the query is translated to the ACPI message, processing continues at block 406.

At block 406, the mapping driver 230 transmits the ACPI message to the ACPI driver 233. The ACPI driver 233 then responds to the ACPI message in the fashion appropriate for the message. For example, if the ACPI message requested the data stored in the temperature register 307, the ACPI driver 233 may retrieve the data from the temperature register 307, store the data in a particular buffer identified by the ACPI message, and issue a callback informing the mapping driver 230 to retrieve the data from the buffer. It will be apparent to those skilled in the art that, in addition to the specific examples provided here, any functionality currently available to existing ACPI systems may equally be available to user mode applications that make use of embodiments of the present invention. Processing then terminates at ending block 408.

Figure 5:
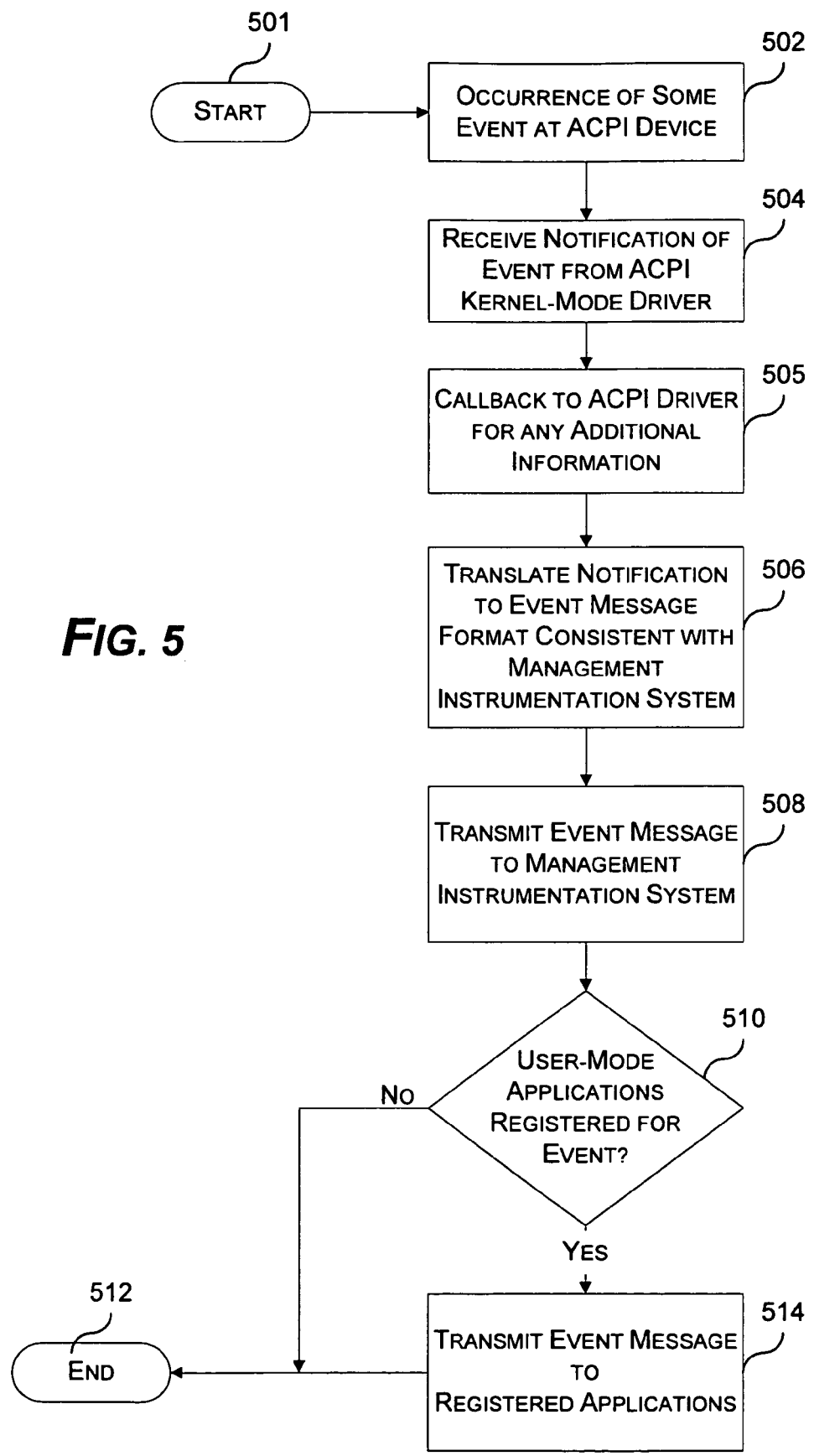
FIG. 5 is a flow chart illustrating a process for an ACPI hardware device to issue a notification of some event to a user mode application by way of the mapping driver, constructed in accordance with the present invention.

FIG. 5 is a logical flow diagram illustrating a process for an ACPI capable hardware device to transmit ACPI information to a user mode application registered to receive the information. The process begins at starting block 501 where a user mode application, such as management application 201, has registered with the management instrumentation system to receive a notification when a particular event occurs associated with the ACPI device 235. Processing begins at block 502.

At block 502, the event for which the user mode application has registered occurs at the ACPI device. For instance, the user mode application may have registered to be informed when the operating temperature of the computer 20 exceeds a predetermined threshold. Through the process illustrated in FIG. 4, the management instrumentation system may have set the ACPI device 235 to issue an event notification message when the value stored in the temperature register 307 exceeds the threshold. Consequently, at block 502, the value in the temperature register 307 may have exceeded the threshold. Upon the occurrence of the event, processing proceeds to block 504.

At block 504, the mapping driver 230 receives a notification of the occurrence of the event from block 502. The notification may take the form of an ACPI message issued to the mapping driver 230 from the ACPI driver 233, both executing in kernel mode. Processing then continues at block 505.

At block 505, the mapping driver 230 calls a control method within the ACPI driver 233 to obtain additional information about the event, such as the actual temperature, and the control method returns with this information. For example, if a temperature threshold is exceeded, the mapping driver 230 may call a control method within the ACPI driver 233 to retrieve the current temperature. Processing continues at block 506.

At block 506, the mapping driver 230 translates the notification from a format consistent with the ACPI system to a format consistent with the management instrumentation system and includes the additional information returned from the control method invocation. For example, the notification may include a code identifying the particular event that occurred. The code may be mapped to a corresponding GUID associated with a management instrumentation system equivalent of the ACPI message. In that case, the mapping driver 230 builds an event message, based on the mapping of the code, consistent with the management instrumentation system format and includes the additional information. The mapping driver 230 may also retrieve any additional data associated with the event and identified by the ACPI message. Processing then proceeds to block 508.

At block 508, the mapping driver 230 transmits the event message built at block 506 to the management instrumentation system. The event message may be passed from the mapping driver 230 to the management instrumentation system via the WDM Provider KM 217 and the WDM Provider UM 215. Processing continues at decision block 510.

At decision block 510, the management instrumentation system, by the WMI agent 207, may determine whether any user mode applications have registered to be notified of the occurrence of the event. The WMI agent 207 may maintain an internal registry of such applications. If there are no applications registered to be notified of the event, processing proceeds to ending block 512 where the process terminates. Otherwise, processing proceeds to block 514.

At block 514, the WMI agent 207 transmits a notification message to the registered applications and processing then proceeds to ending block 512, where the process terminates.

While various embodiments, including the preferred embodiment, of the invention have been illustrated and described, it will be appreciated that various changes can be made therein without departing from the spirit and scope of the invention.

The embodiments of the invention in which an exclusive property or privilege is claimed are defined as follows:

1. A computing system having an operating environment with at least two operational modes for interfacing a user application to a system component, the system comprising:
    a processor;
    a system memory;
    at least one system component; and
    wherein the computing system is configured to provide:
        a management module operating in a first operational mode that, in response to an instruction from an external application operating in the first operational mode, issues a first interface message to the system component; and
        a translation module operating in a second operational mode, communicatively coupled to the system component, and further communicatively coupled to the management module, that receives the first interface message from the management module, translates information in the first interface message to create a second interface message, and issues the second interface message to the system component.

2. The system of claim 1, wherein the system component has a corresponding interface module operating in the second operational mode, and wherein the translation module issues the second interface message to the system component via the corresponding interface module.

3. The system of claim 2 further comprising a communication channel for delivering interface messages between the management module operating in the first operational mode and the translation module operating in the second operational mode.

4. The system of claim 3, wherein the communication channel comprises:
    a first communication module operating in the first operational mode; and
    a second communication module operating in the second operational mode;
    wherein the first and second communication modules are communicatively coupled to deliver interface messages between the management module operating in the first operational mode and the translation module operating in the second operational mode.

5. The system of claim 2, wherein, if the first interface message includes a request for data from the system component, the translation module further receives the requested data from the corresponding interface module and issues a third interface message to the management module that includes the requested data.

6. The system of claim 2, wherein, if the first interface message includes a request to set data at the system component, the translation module further receives the data to be set from the management module, and includes the data in the second interface message.

7. The system of claim 2, wherein, if the first interface message includes a request to monitor for an event to occur at the system component, the translation module includes a request in the second interface message to be notified when the event occurs, and upon receiving notification that the event occurred, issues a third interface message to the management module indicating that the event occurred.

8. The system of claim 2, wherein the translation module translates the first interface message to create a second interface message by:
   obtaining a globally unique identifier from the first interface message;
   identifying a code associated with the globally unique identifier; and
   creating the second interface message to include the code associated with the globally unique identifier.

9. The system of claim 2, wherein the first operational mode is a user mode.

10. The system of claim 2, wherein the second operational mode is a kernel mode.

11. The system of claim 2, wherein the corresponding interface module is an advanced configuration and power interface.

12. The system of claim 1, wherein the translation module translates information in the first message to create the second message by:
   obtaining a globally unique identifier from the first message;
   identifying a code associated with the globally unique identifier; and
   creating the second message according to the code associated with the globally unique identifier.

13. The system of claim 12, wherein the translation module further translates information in the first message to create the second message by:
   determining whether the first message includes a request to set data at the system component, and if so, receiving the data to be set from the management system and including the data to be set at the system device in the second message.

14. The system of claim 1, wherein the system component is a Windows Management Instrumentation (WMI) instrumented component.

15. The system of claim 14, wherein the system component is a WMI instrumented software device.

16. The system of claim 1, wherein the system component is a hardware device.

17. The system of claim 1, wherein the system component is a software device.

* * * * *